May 6, 1952 F. P. PALMOS 2,595,481
DISPENSER FOR SLICED BREAD
Filed April 28, 1949 4 Sheets-Sheet 1

INVENTOR
Frank P. Palmos
BY
ATTORNEYS

May 6, 1952     F. P. PALMOS     2,595,481

DISPENSER FOR SLICED BREAD

Filed April 28, 1949     4 Sheets-Sheet 4

INVENTOR
Frank P. Palmos

BY

ATTORNEYS

Patented May 6, 1952

2,595,481

UNITED STATES PATENT OFFICE 2,595,481

DISPENSER FOR SLICED BREAD

Frank P. Palmos, Monroe, La.

Application April 28, 1949, Serial No. 90,159

3 Claims. (Cl. 312—70)

This invention is directed to the art of food dispensers wherein food, such as sliced bread, is maintained clean and fresh for use; the device being especially designed, but not limited, for use in public eating places.

One object of the present invention is to provide a dispenser, for sliced bread, which is operative to deliver slices of bread, one at a time, from a container onto a manually supported plate without the hand touching the bread.

Another object of the invention is to provide a dispenser, as above, which is actuated by engagement of the plate with a movable member of the device as the plate is urged beneath a predetermined discharge point for the bread slices.

A further object of the invention is to provide a dispenser, for sliced bread, which includes a container for a stack of sliced bread, the slices being discharged one at a time from the lower end of the container, and there being a novel shutter mechanism which automatically works between the bottom slice and the next uppermost slice to prevent dispensing of all but said bottom slice upon actuation of the device.

An additional object of the invention is to provide a dispenser, for sliced bread, which is designed for ease and economy of manufacture; the structure being simple but sturdy.

It is also an object of the invention to provide a dispenser, for sliced bread, which is convenient to use, and reliable in operation.

A further object of the invention is to provide a practical dispenser, for sliced bread, and one which will be exceedingly effective for the purpose for which it is designed.

These objects are accomplished by means of such structure and relative arrangement of parts as will fully appear by a perusal of the following specification and claims.

Figure 1:
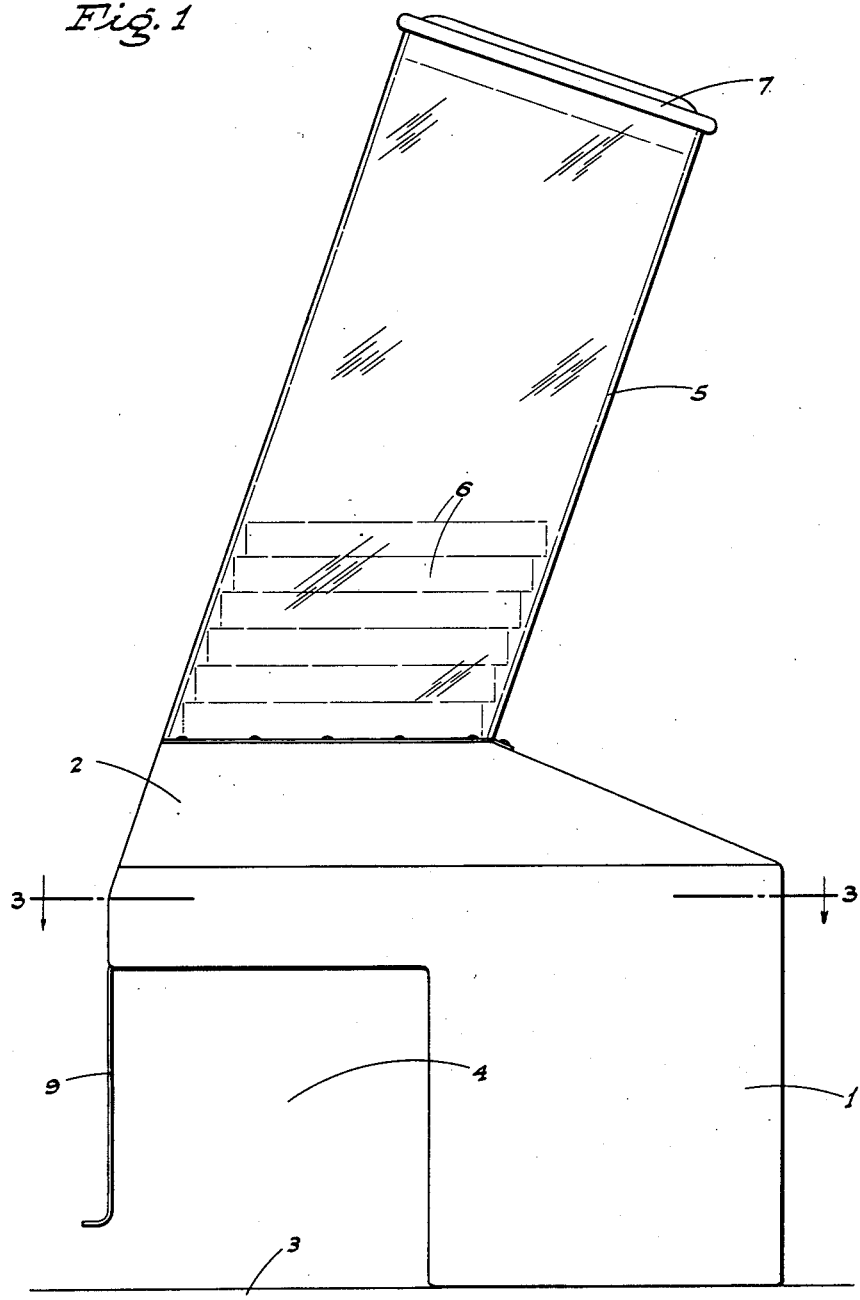
Fig. 1 is a side elevation of the dispenser.

Referring now more particularly to the characters of reference on the drawings, the device comprises an upstanding housing, indicated generally at 1, which includes an upper, forwardly projecting portion 2 which overhangs the table 3 with substantial clearance relation, to provide an open access area 4.

The upper, forwardly projecting portion of the housing 1 supports, in rigid relation, an upstanding magazine or container 5 for a stack of bread slices 6. The upstanding container 5 is of transparent material, inclines upwardly and rearwardly for the reason hereinafter described, and is fitted at the top with a removable lid 7.

The upward and rearward incline of the container 5 is for the purpose of causing the bread slices 6 in said container to offset slightly, whereby to prevent them from sticking together and to permit of ready dispensing thereof, one at a time, downwardly from the lower end of the container under the control of mechanism hereinafter described.

The lower end portion of the upstanding container 5 projects into the housing 1 some distance, and opens through the bottom of the forwardly projecting portion 2 of housing 1 directly above the access area 4.

The lower, open end of the upstanding container 5, and the corresponding open bottom of the forwardly projecting portion 2 of the housing, are normally closed by a horizontal, longitudinal slide plate 8 which includes a trigger 9 which depends from the front edge of said slide plate, as shown.

The slide plate 8 normally supports the stack of bread slices 6, and said slide plate is in turn supported, at opposite edges, by longitudinal ball bearing slides, indicated generally at 10. The slides 10 each include a lateral supporting flange 11 on the slide plate 8 overhanging a cooperating race-way 12 on the adjacent side of the housing, with bearings 13 engaged between said parts.

Figure 2:
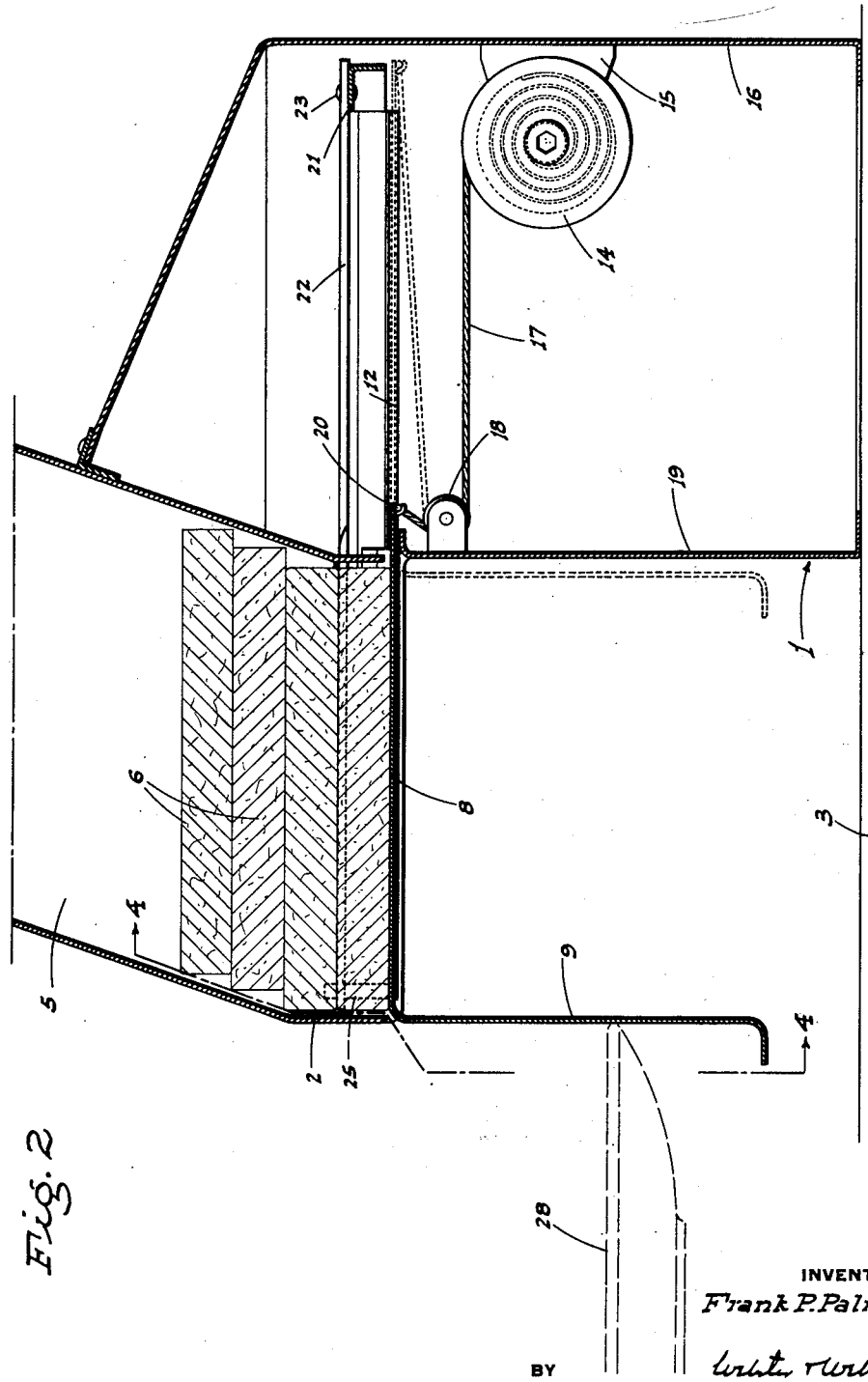
Fig. 2 is an enlarged fragmentary sectional elevation of the dispenser with the parts in normal position.
Figure 3:
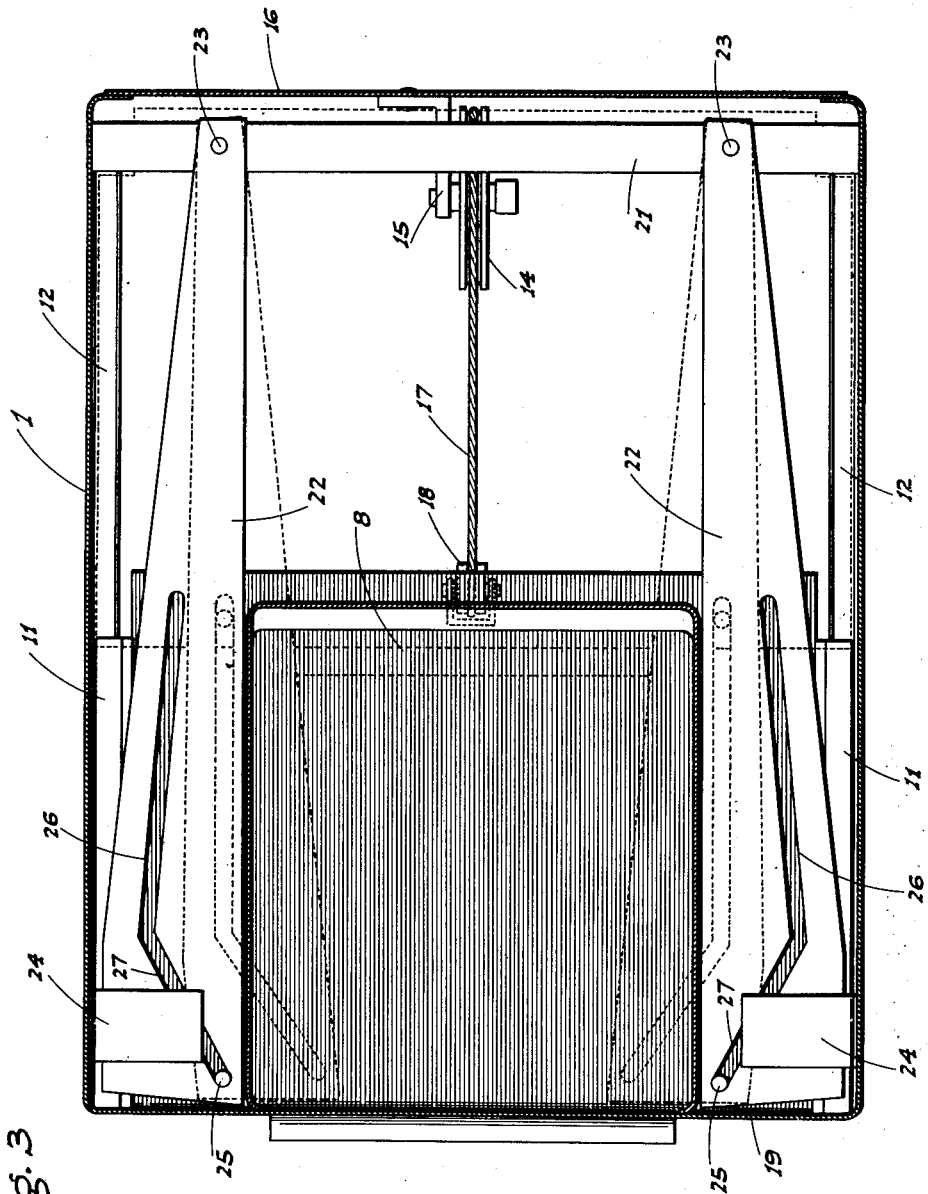
Fig. 3 is a sectional plan on line 3—3 of Fig. 1.
Figure 4:
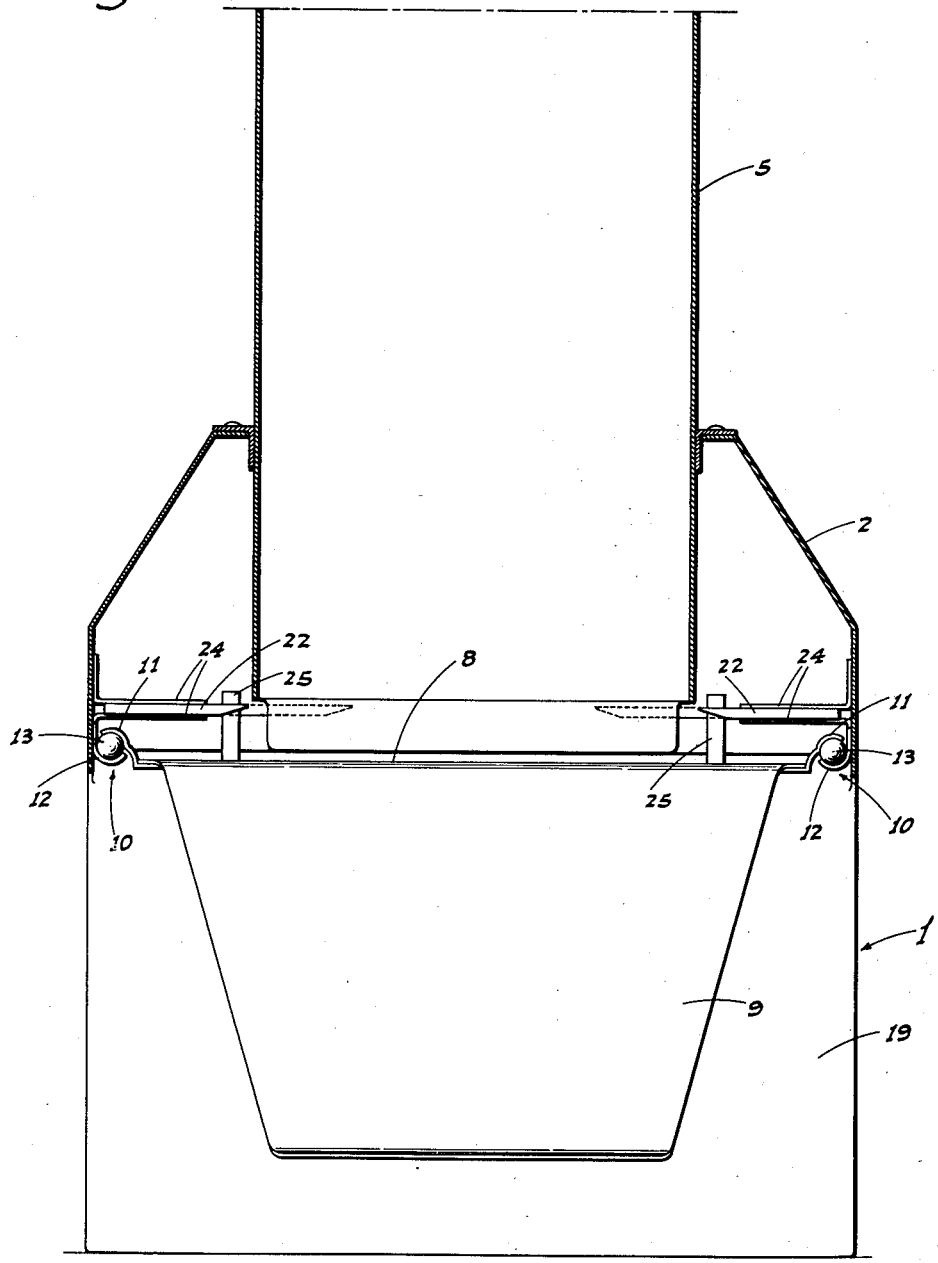
Fig. 4 is a cross section on line 4—4 of Fig. 2.

With the above arrangement the slide plate 8 can be shifted from its advanced position, as in full lines in Fig. 2, to retracted position, as in dotted lines in said figure.

The slide plate 8 is normally maintained in its advanced position by the following mechanism:

A coil-type, pull-back, spring unit 14 is mounted by a bracket 15 on the back wall 16 of the housing 1, and a flexible cord or tape 17 extends forwardly from said pull-back spring unit 14. The flexible cord 17 turns about a direction changing pulley 18 on the front wall 19 of the housing, and thence said cable extends rearwardly to connection, as at 20, to the rear end of the slide plate 8.

The pull-back spring unit 14 is always under load, so that its tends to urge the slide plate 8 to its normally advanced or closed position.

The numerial 21 indicates a horizontal cross member in the housing 1 above the pull-back spring unit 14, and a pair of transversely spaced, flat shutters 22 are pivoted, at their rear ends, as at 23, to the cross bar 21, and thence extend forwardly in the housing into the forwardly projecting portion 2 thereof on opposite sides of the lower end of the upstanding container 5. The shutters 22 are normally disposed clear, in a laterally outward direction, of the lower end of the upstanding container 5, but are disposed in a plane to swing beneath the latter.

At their forward end portions the shutters 22 work between vertically spaced guides 24 mounted in the forwardly projecting portion 2 of the housing 1 on opposite sides thereof.

The slide plate 8 is of considerably greater width than the upstanding container 5, and thus projects laterally beyond opposite sides of said container. The laterally projecting portions of the slide plate 8 are each fitted, adjacent the front end thereof, with an upstanding pin 25 which projects into a longitudinal slot 26 in the corresponding shutter 22. The front end portions of the slots are angled laterally inwardly relatively sharply, as at 27, and the pins 25 normally seat in the front end of said slots 26.

The above described dispenser functions as follows:

A plate 28, supported in the hand, is placed against the front of the trigger 9, and both are pushed rearwardly until said trigger is adjacent the wall 19 of the housing. This shifts the slide plate 8 rearwardly to a clearance position with respect to the lower open end of the container 5, whereupon the lowermost bread slice 6 drops onto the plate.

The next uppermost slice, and the stack thereabove, is prevented from dispensing for the reason that the shutters 22 shift laterally inwardly between the lowermost slice and the next uppermost slice when the slide plate 8 is retracted; this motion of the shutters 22 being caused by the pins 25 riding along the slots 26, particularly the converging forward end portions 27 of the latter.

After the lowermost bread slice is dispensed onto the plate 28, with the latter then in the open access area 4, the plate 28 is withdrawn. Immediately the pull-back spring unit 14 returns the slide plate 8 to closed position, catching the stack of bread slices as the shutters 22 swing laterally outward to their normal clearance position. The device is then ready for the next dispensing operation.

The dispenser, for sliced bread, described above, provides a very practical and convenient device for the purpose; the slices of bread as maintained in the container 5 remaining fresh, clean, and appetizing in appearance.

From the foregoing description it will be readily seen that there has been produced such a device as substantially fulfills the objects of the invention, as set forth herein.

While this specification sets forth herein the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. A dispenser for sliced bread, comprising a housing, an upstanding container for a stack of sliced bread, said container being initially open at the lower end and mounted on the housing with said lower end exposed above an access area, a slide plate mounted on the housing for sliding motion between a position normally closing the lower end of the container to an open position clear thereof, spring means yieldably urging the slide plate to closed position, and a shutter mounted adjacent the lower end of the container normally clear thereof but operative to move below the container between the lowermost bread slice and next uppermost bread slice upon sliding motion of the slide plate between said closed and open positions; the shutter including a slot therein, and the slide plate being fitted with an element which runs in the slot, the latter being formed to cause the shutter to move into an operative slice-retaining position above the slide plate as such plate moves to said open position.

2. A dispenser for sliced bread, comprising a housing, an upstanding container for a stack of sliced bread, said container being initially open at the lower end and mounted on the housing with said lower end exposed above an access area, a horizontal slide plate mounted on the housing for sliding motion between an advanced position normally closing the lower end of the container and a retracted open position clear thereof, a spring unit in the housing connected to the slide plate yieldably urging the same to closed position, a trigger on the slide plate for actuation to move the same between closed and open positions, a transversely spaced pair of flat shutters mounted in the housing adjacent the lower end of the container for movement between normal positions laterally clear of the container to working positions below the container between the lowermost and next uppermost bread slices, and means between the slide plate and shutters to cause the latter to move to said working positions upon the slide plate moving to its open position.

3. A dispenser for sliced bread, comprising a housing, an upstanding container for a stack of sliced bread, said container being initially open at the lower end and mounted on the housing with said lower end exposed above an access area, a horizontal slide plate mounted on the housing for manual sliding motion between an advanced position normally closing the lower end of the container and a retracted open position clear thereof, a spring unit in the housing connected to the slide plate yieldably urging the same to closed position, a trigger on the slide plate for manual actuation to move the same between closed and open positions, a transversely spaced pair of flat shutters mounted in the housing adjacent the lower end of the container for swinging motion between normal positions laterally clear of the container to working positions below the container between the lowermost and next uppermost bread slices, and means between the slide plate and shutters to cause the latter to swing to said working positions upon the slide plate moving to its open position; said means being pin and slot connections between the slide plate and shutters.

FRANK P. PALMOS.

REFERENCES CITED

The following references are of record in the file of this patent:

UNITED STATES PATENTS

| Number | Name | Date |
|---|---|---|
| 463,847 | Tollner | Nov. 24, 1891 |
| 913,151 | Neher | Feb. 23, 1909 |
| 1,555,955 | Weaver | Oct. 6, 1925 |
| 1,881,894 | Olsen | Oct. 11, 1932 |